(12) United States Patent
Gutierrez et al.

(10) Patent No.: US 8,490,497 B2
(45) Date of Patent: Jul. 23, 2013

(54) MICROELECTROMECHANICAL (MEMS) PRESSURE TRANSDUCER

(75) Inventors: Christian A. Gutierrez, Los Angeles, CA (US); Ellis Meng, Alhambra, CA (US)

(73) Assignee: University of Southern California, Los Angeles, CA (US)

( * ) Notice: Subject to any disclaimer, the term of this patent is extended or adjusted under 35 U.S.C. 154(b) by 170 days.

(21) Appl. No.: 13/052,958

(22) Filed: Mar. 21, 2011

(65) Prior Publication Data

US 2011/0233066 A1    Sep. 29, 2011

Related U.S. Application Data

(60) Provisional application No. 61/317,609, filed on Mar. 25, 2010.

(51) Int. Cl.
*G01L 9/00* (2006.01)
*H01S 4/00* (2006.01)

(52) U.S. Cl.
USPC ............................................ 73/754; 29/592.1

(58) Field of Classification Search
USPC ................................................... 73/700–756
See application file for complete search history.

(56) References Cited

U.S. PATENT DOCUMENTS

| | | | |
|---|---|---|---|
| 4,265,251 A | 5/1981 | Tickner | |
| 4,561,450 A | 12/1985 | Bryant | |
| 4,825,685 A * | 5/1989 | Breimesser | 73/727 |
| 5,187,984 A * | 2/1993 | Mosser et al. | 73/708 |
| 5,317,921 A * | 6/1994 | Kremidas | 73/721 |
| 6,109,113 A | 8/2000 | Chavan et al. | |
| 6,401,545 B1 | 6/2002 | Monk et al. | |
| 7,536,915 B2 * | 5/2009 | Strietzel et al. | 73/718 |
| 2004/0134283 A1 | 7/2004 | Lewis | |
| 2005/0046429 A1 | 3/2005 | Gruebler et al. | |
| 2006/0162461 A1 * | 7/2006 | Amore et al. | 73/724 |
| 2010/0217209 A1 | 8/2010 | Meng et al. | |
| 2010/0222769 A1 | 9/2010 | Meng et al. | |
| 2010/0263451 A1 * | 10/2010 | Friedl et al. | 73/723 |
| 2011/0209553 A1 * | 9/2011 | Crivelli | 73/721 |

FOREIGN PATENT DOCUMENTS

| | | |
|---|---|---|
| WO | 2010099210 | 9/2010 |
| WO | 2011119886 A2 | 9/2011 |

OTHER PUBLICATIONS

Ayliffe H.E. et al. 2003. An electric impedance based MEMS system flow sensor for ionic solutions. Measurement science and Technology, vol. 14, pp. 1321-1327.

(Continued)

*Primary Examiner* — Andre Allen
(74) *Attorney, Agent, or Firm* — McDermott Will & Emery LLP

(57) ABSTRACT

A pressure transducer for measuring pressure may include an all-polymer chamber that has no dimension greater than 1 mm. There may be fluid within the chamber, a gaseous bubble trapped within the fluid, and electrodes in contact with the fluid. The electrodes may enable a measurement of changes in the impedance of the fluid caused by changes in the volume of the gaseous bubble caused by changes in the pressure to be measured.

The pressure transducer may be made by depositing the chamber, placing the fluid within the chamber, and generating the gaseous bubble within the fluid with electrolysis.

22 Claims, 6 Drawing Sheets

OTHER PUBLICATIONS

International Search Report and Written Opinion of the International Searching Authority (ISA/KR), dated Dec. 22, 2011, for PCT Application No. PCT/US2011/029866, entitled Microelectromechanical (MEMS) Pressure Transducer, published Sep. 29, 2011 as WO 2011/119886 A2.

Ateya, D.A. et al. 2005. Impedance-based response of an electrolytic gas bubble to pressure in microfluidic channels. Sensors and Actuators A, vol. 122, pp. 235-241.

Epstein, P.S. et al. 1950. On the stability of gas bubbles in liquid-gas solutions. J. Chem. Phys., vol. 18, pp. 1505-1509.

Ran, B. et al. 1991. The response of microscopic bubbles to sudden changes in ambient pressure. J. Fluid Mech., vol. 224, pp. 91-115.

Wolgemuth, L. 2000. Assessing the performance and suitability of parylene coating. Med. Device Diagn. Ind., vol. 22, pp. 42-49.

Ayliffe H.E. et al. An electric impedance based MEMS system flow sensor for ionic solutions. Measurement science and Technology, vol. 14, pp. 1321-1327.

Bouakaz A. et al. 1999. Noninvasive measurement of the hydrostatic pressure in a fluid-filled cavity based on the disappearance time of micrometer-sized free gas bubbles. Ultrasound in Med. & Biol., vol. 25, No. 9, pp. 1407-1415.

Gutierrez C.A. et al. 2010. A Subnanowatt Microbubble Pressure Transducer. Proc Hilton Head Workshop: A Solid-State Sensors, Actuators and Microsystems Workshop, Hilton Head Island, SC, pp. 57-60, Jun. 6-10, 2010.

Gutierrez C.A. et al. 2011. A Subnanowatt Microbubble Pressure Sensor based on Electrochemical Impedance Transduction in a Flexible All-Parylene Package. Proc. IEEE MEMS, Cancun, Mexico, pp. 549-552, Jan. 23-27, 2011.

Matsumoto S. et al. 2008. New methods for liquid encapsulation in polymer MEMS structures. Proc. IEEE MEMS Conference, pp. 415-418.

Shankar P.M. et al. 1986. Fluid pressure measurement using bubbles insonified by two frequencies. Ultrasonics., vol. 24, Nov. 1986, pp. 333-336.

Wettels N. et al. 2008. Biomimetic tactile sensor array. Advanced robotics, vol. 22, pp. 829-849.

\* cited by examiner

MICROELECTROMECHANICAL (MEMS) PRESSURE TRANSDUCER

CROSS-REFERENCE TO RELATED APPLICATION

This application is based upon and claims priority to U.S. provisional patent application 61/317,609, entitled "POLYMER MEMS MICROBUBBLE PRESSURE TRANSDUCER," filed Mar. 25, 2010. The entire content of this application is incorporated herein by reference.

STATEMENT REGARDING FEDERALLY SPONSORED RESEARCH

This invention was made with Government support under Grant No. EEC-0310723, awarded by the National Science Foundation Engineering Research Center—Biomimetic Microelectronic Systems (BMES) and Grant No. ECS-0547544 from the National Science Foundation. The Government has certain rights in the invention.

BACKGROUND

1. Technical Field

This disclosure relates to pressure transducers and to microelectromechanical (MEMS) structures.

2. Description of Related Art

Pressure transducers typically utilize diaphragms to sense pressure and require footprints of at least 300-400 μm. Much smaller pressure transducers could be useful in several applications, including biomedical applications, such as intracranial pressure monitoring, cardiac pressure monitoring, urological pressure monitoring, intraocular pressure monitoring, and direct intravenous pressure monitoring. Smaller transducers could also be useful in other applications, such as industrial pressure sensing, food processing, and underwater robotics.

SUMMARY

A pressure transducer for measuring pressure may include a chamber that has no dimension greater than 1 mm and pressure-sensing components configured to measure pressure within the chamber.

The pressure-sensing components may be configured to measure hydrostatic pressure within the chamber.

The pressure-sensing components may include fluid within the chamber, a gaseous bubble within the fluid, and volume-sensing components configured to measure changes in the volume of the gaseous bubble caused by changes in the hydrostatic pressure of the fluid.

The volume-sensing components may include electrochemical impedance sensing components configured to measure changes in the impedance of the fluid caused by changes in the volume of the gaseous bubble. The electrochemical impedance sensing components may include electrodes in contact with the fluid.

The pressure transducer may have electrodes configured to generate the gaseous bubble by electrolysis.

The pressure transducer may be configured to measure hydrostatic pressure of fluid outside of the chamber. The pressure transducer may include at least one port through the chamber configured to transfer the hydrostatic pressure from the fluid outside of the chamber to fluid within the chamber.

The chamber may be made of polymeric material, such a Parylene-C.

A process for manufacturing a pressure transducer for measuring pressure may include making a chamber, placing fluid within the chamber, and generating a gaseous bubble within the fluid in the chamber.

The gaseous bubble may be generated with electrolysis.

The chamber may be used to contain the gaseous bubble.

The chamber may be made by a deposition process. Certain deposited material may be removed.

A process for manufacturing a pressure transducer for measuring pressure may include depositing a series of layers on a substrate and removing at least one deposited layer. The deposited layer which is removed may be made of a photoresist material.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings are of illustrative embodiments. They do not illustrate all embodiments. Other embodiments may be used in addition or instead. Details which may be apparent or unnecessary may be omitted to save space or for more effective illustration. Some embodiments may be practiced with additional components or steps and/or without all of the components or steps which are illustrated. When the same numeral appears in different drawings, it refers to the same or like components or steps.

DETAILED DESCRIPTION OF ILLUSTRATIVE EMBODIMENTS

Figure 1:
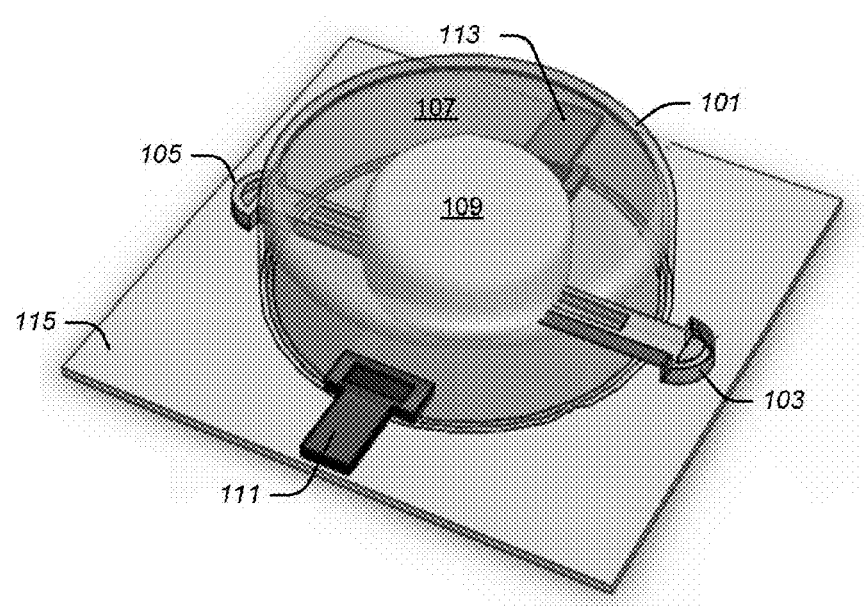
FIG. 1 illustrates an example of a microelectromechanical systems (MEMS) pressure transducer.

Illustrative embodiments are now described. Other embodiments may be used in addition or instead. Details which may be apparent or unnecessary may be omitted to save space or for a more effective presentation. Some embodiments may be practiced with additional components or steps and/or without all of the components or steps which are described.

A microbubble-based pressure transducer may be made of all-polymer materials. The sensor footprint may be reduced to about 10-200 µm in diameter and about 1-20 µm in height or even less. An electrochemical-based pressure sensing technique may be used which does not utilize any diaphragm. Power consumption may be below 10 nanowatts. Hermetic packaging for use in wet environments may not be necessary.

Applications for the pressure sensor may include biomedical applications, such as intracranial pressure monitoring, cardiac pressure monitoring, urological pressure monitoring, intraocular pressure monitoring, and direct intravenous pressure monitoring. The device may function wirelessly without attached wires. The pressure sensor may also be useful in other applications, such as industrial pressure sensing, food processing, and underwater robotics.

A gaseous bubble may be formed and entrapped within a microstructure. The microstructure may be of any size and shape. For example, the microstructure may be a cylindrical chamber of approximately 10-200 µm diameter and 1-20 µm height. The chamber may be made entirely of a polymeric material, such as Parylene C.

Parylene C is a transparent thin-film biocompatible polymer that may be deposited at room temperature through a chemical vapor deposition process. The deposition may be generally conformal, pin-hole free, and may exhibit excellent moisture barrier properties, good mechanical strength, electrical insulating properties, excellent chemical resistance, and may be integrated with standard microfabrication techniques. It has a United States Pharmacopoeia (USP) Class VI biocompatibility standing required for implantable applications.

Microelectrodes may be integrated into the substrate and exposed to liquid within the chamber. The electrodes may be made of a conductive material, such as platinum. The electrodes may enable changes to be measured in the electrochemical impedance of the fluid. These impedance changes may be caused by changes in the volume of the gaseous bubble which may be caused by changes in the fluidic pressure to be measured.

Multiple layers of Parylene C may be used to form an underlying substrate, micro ports, electrode lead insulation, and the chamber. (The insulation over the electrodes within the chamber may be selectively removed, defining exposed electrode areas for use.) Other polymers may be substituted for Parylene C.

Device operation may begin with the generation of a gaseous microbubble within the chamber. For some liquids (e.g., deionized water and phosphate buffered saline (PBS)), this may be accomplished by applying a current or voltage across the electrodes, thereby causing electrolysis (i.e., separation of the water into hydrogen and oxygen gas). The gases may ultimately form a single gaseous bubble which may remain trapped within the chamber. Other methods of bubble generation and/or entrapment may be used in place of electrolysis, such as thermal generation or direct injection of a bubble from a gas source for bubble generation and a trench or a cage for entrapment. Similarly, other fluids may be substituted, such as bodily fluids (including blood, urine, aqueous humour, cerebrospinal fluid, saliva), saline, cell culture media, sea water, strong/weak acids, strong/weak bases and in general any medium containing water.

The MEMS pressure transducer may be placed within fluid that is exposed to the pressure to be measured. One or more ports within the MEMS pressure transducer may allow the external fluid to apply pressure to the internal fluid. The fluids may be incompressible, thus causing the pressure to be faithfully and uniformly transmitted to the gaseous bubble.

The gaseous bubble may respond to changes in this pressure by changing its volume. This may change the cross-sectional area of the fluid which surrounds the gaseous bubble within the chamber, and hence its impedance. The gaseous bubble may expand in response to a pressure decrease, for example, causing the electrochemical impedance of the interior fluid to increase. The gaseous bubble may compress in response to a pressure increase, on the other hand, causing the electrochemical impedance to decrease.

Any technique may be used to measure the electrochemical impedance. For example, an LCR meter or an impedance/network analyzer may be used. Measurement of the electrochemical impedance may be accomplished by applying a low frequency (e.g., in the 5-50 kHz range) AC voltage (e.g., in the 1-100 mV range) across the integrated electrodes in contact with the interior fluid. This measurement may require very little current (e.g., 1-100 nA) and hence very low power.

Electrochemical impedance measurements may thus be correlated in real-time to the gaseous bubble size which, in turn, may be a direct measurement of the external pressure. Gaseous bubbles having a 50 µm radius may have a resonant frequency of up to 55 kHz, thus enabling a rapid response to pressure changes.

The volume of the gaseous bubble may be measured by techniques other than impedance measurements, such as with optical or acoustic techniques (including ultrasound imaging and backscattering approaches).

The gaseous bubble may slowly dissolve back into the fluid. It may be regenerated with electrolysis or a different process each time a pressure measurement is desired.

Inductively coupled coils may enable the sensor to be utilized in wireless applications. One coil may be integrated within a substrate in the sensor and may communicate wirelessly with a corresponding coil in an external control unit. The wireless link may serve to transmit the power necessary to generate and regenerate the gaseous bubble and to measure the impedance of the fluid.

The pressure transducer may include a substrate, such as a 1-10 µm Parylene C substrate. The pressure transducer may include one or more fluidic access ports between the exterior and interior of the chamber (e.g., ~1-5 µm height, 10-100 µm width, 25-150 µm length, and 1-5 µm membrane thickness). These ports may enable fluid to fill the chamber from the surrounding environment and, thereafter, the pressure of fluid outside of the chamber to be transmitted to the fluid within the chamber. However, these ports may be sized and positioned so as not to allow the gaseous bubble to escape from the chamber.

The chamber may be fabricated over the fluidic access ports. The chamber may be of any size (e.g., 10-200 µm diameter, 1-20 µm height, and 1-5 µm thick). The chamber and ports may be made of a polymeric material which has favorable mechanical properties, biocompatibility, and is able to integrate easily with standard microfabrication techniques, such as Parylene C.

Platinum thin-film electrodes (e.g., 500-2000 Å thick, approx. 45 µm×75 µm) may be fabricated between the substrate and ports and may be exposed to the fluid within the interior of the chamber. They may be positioned so that changes in the volume of the gaseous bubble will cause corresponding changes in the impedance of the fluid between the electrodes. For example, they may be positioned so as to surround the gaseous bubble.

An all-Parylene C construction may give flexibility to the transducer and enable the transducer to be released from the fabrication substrate (e.g., a soda-lime wafer) by cutting and peeling. An array of such devices may be fabricated at the end of long flat flexible Parylene C cable.

FIG. 1 illustrates an example of a microelectromechanical pressure transducer. As illustrated in FIG. 1, a completely enclosed chamber 101 may include one or more fluidic access ports to the chamber 101, such as fluidic access ports 103 and 105. Fluid surrounding the chamber 101 may flow through these fluidic access ports to within the chamber 101, thus interfacing with fluid 107 within the chamber 101.

The pressure transducer may include pressure-sensing components configured to measure the pressure within the chamber 101, which may be the same as the hydrostatic pressure of fluid outside of the chamber when the fluid is incompressible. The pressure-sensing components may include the fluid 107 within the chamber, a gaseous bubble 109 within the fluid, and volume-sensing components configured to measure changes in the volume of the gaseous bubble 109 which are caused by changes in the hydrostatic pressure of the fluid 107.

The volume-sensing components may include impedance-sensing components configured to measure changes in the impedance of the fluid 107 caused by changes in the volume of the gaseous bubble 109. The impedance-sensing component may include electrodes in contact with the fluid 107, such as electrodes 111 and 113. The impedance may be sensed by other means. Similarly, changes in the volume of the gaseous bubble 109 may be sensed by other means, such as by optical or acoustic means.

The chamber 101 may be attached to a substrate 115.

Each of the components which has been described may be made of any of the materials and may have any of the configurations that have been discussed above.

Figure 2:
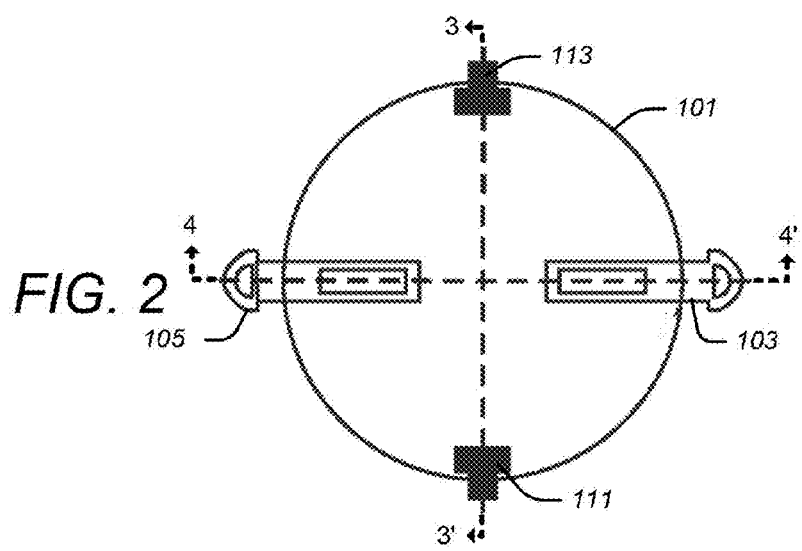
FIG. 2 illustrates a top view of the MEMS pressure transducer illustrated in FIG. 1.

FIG. 2 illustrates a top view of the MEMS pressure transducer illustrated in FIG. 1.

Figure 3:
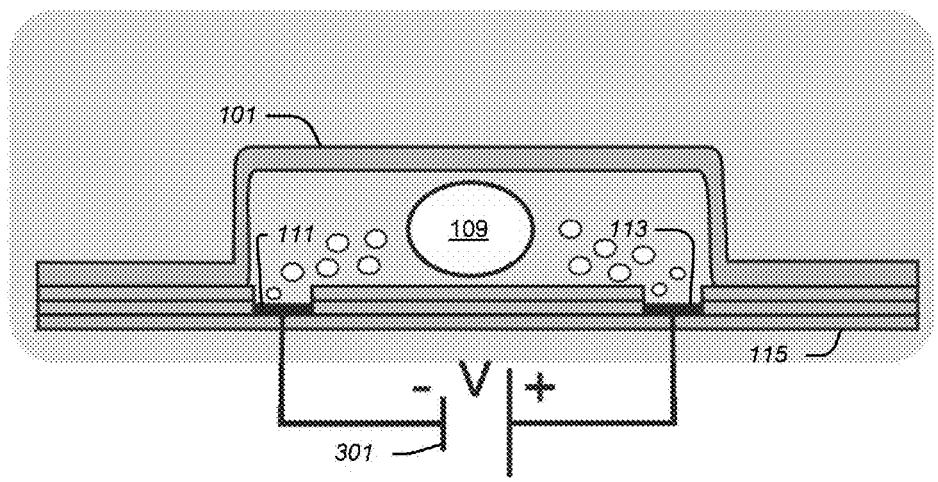
FIG. 3 illustrates a sectional view of the MEMS pressure transducer illustrated in FIG. 1 during the formation of a gaseous bubble taken along the line 3-3' illustrated in FIG. 2.

FIG. 3 illustrates a sectional view of the MEMS pressure transducer illustrated in FIG. 1 during the formation of the gaseous bubble 109 taken along the line 3-3' in FIG. 2. As illustrated in FIG. 3, a voltage source 301 may be applied across the electrodes 111 and 113, causing electrolysis to take place within the fluid 107, thus generating the gaseous bubble 109. The voltage 301 may be of any type. For example, the voltage 301 may be applied as a short current pulse, such as a 1-100 µA pulse for up to five seconds.

Figure 4:
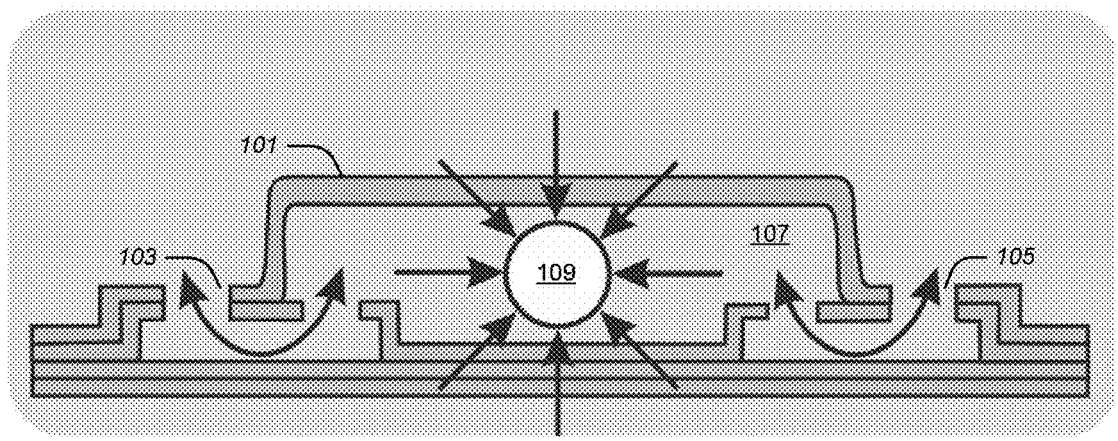
FIG. 4 illustrates a sectional view of the MEMS pressure transducer illustrated in FIG. 1 during the application of hydrostatic pressure taken along the line 4-4' illustrated in FIG. 2.

FIG. 4 illustrates a sectional view of the MEMS pressure transducer illustrated in FIG. 1 during application of hydrostatic pressure taken along the line 4-4' in FIG. 2. As illustrated in FIG. 4, external fluid may flow through fluidic access ports 103 and 105 to the chamber 101. Changes in the pressure of this external fluid may therefore cause corresponding changes in the size of the gaseous bubble 109.

The changes in the size of the gaseous bubble 109 may be measured by any means. For example, and as suggested by FIG. 4, the changes in the volume of the gaseous bubble 109 may change the cross-sectional area of the fluid 107 through which current from the electrodes 111 and 113 may flow. These cross-sectional area changes, in turn, may cause changes in the impedance seen by the electrodes 111 and 113. These changes in impedance, in turn, may be measured, such as in the ways discussed above.

Optical or acoustic technologies may in addition or instead be used to measure changes in the volume of the gaseous bubble 109 and, in turn, the pressure of the external fluid.

Figure 5:
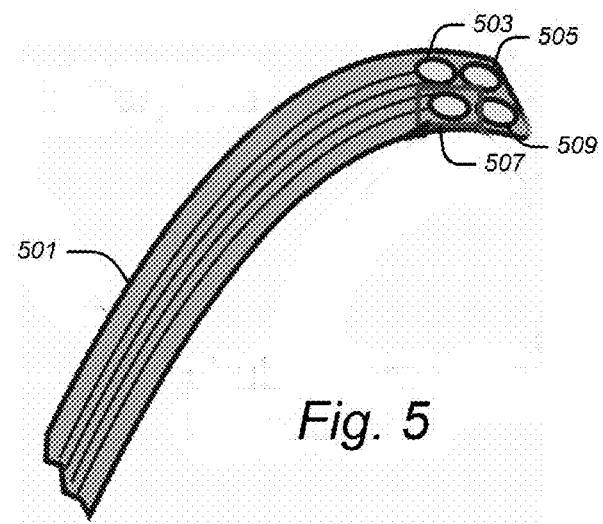
FIG. 5 illustrates an example of several of the MEMS pressure transducers illustrated in FIG. 1 connected at an end of a flat, flexible cable.

FIG. 5 illustrates an example of several of the MEMS pressure transducers illustrated in FIG. 1 connected at an end of a flat, flexible cable. As illustrated in FIG. 5, a flat, flexible cable 501 may have a plurality of MEMS pressure transducers affixed at an end, such as MEMS pressure transducers 503, 505, 507, and 509. Each of these MEMS pressure transducers may take any of the forms discussed above. They may be positioned so as to monitor pressure in various areas of the surrounding environment, such as up and downstream intravenous pressure or simultaneous multi-chamber cardiac pressure. A different number of micromechanical pressure transducers may instead be affixed to the flexible cable 501, such as 8, 6, 3, 2, or even 1. Electrical connections to each of the MEMS transducers may run through the flexible cable 501 so as to supply needed power to the micromechanical pressure transducers and to receive pressure-measuring signals therefrom.

The flexible cable 501 may be made of any material. For example, the flexible cable 501 may be made of Parylene C.

FIGS. 6(A)-6(F) illustrate an example of a process for manufacturing the MEMS pressure transducer illustrated in FIG. 1. The MEMS pressure transducer may be fabricated at relatively low temperatures (e.g., 90° C.). This may enable it to be fabricated on a variety of polymer-based substrates and in temperature sensitive processes. Parylene C may be used as the structural material for its combination of mechanical strength, electrical insulating properties, and biocompatibility. Standard surface micromachining techniques may be used for sensor fabrication.

Figure 6:
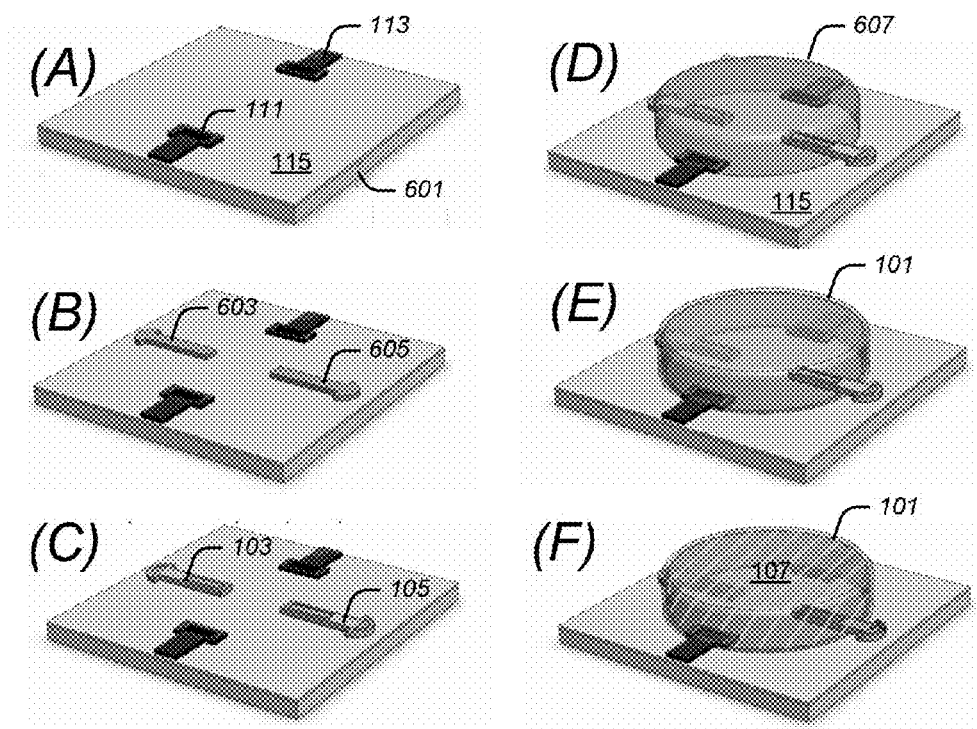
FIGS. 6(A)-6(F) illustrate an example of a process for manufacturing the MEMS pressure transducer illustrated in FIG. 1.

As illustrated in FIG. 6A, a Parylene-C substrate 115 (e.g., 10 µm thick) may be formed on a fabrication substrate 601 by deposition and patterning or other techniques. The fabrication substrate 601 may be of any material, such as soda lime, and thickness (e.g., 10 µm). Electrodes 111 and 113 may then be formed on the Parylene substrate 115 by deposition and patterning or other techniques. They may be of any material, size, and thickness (e.g., platinum, 45 µm×75 µm, and 500-2000 Å thick).

As illustrated in FIG. 6(B), sacrificial photoresist layers 603 and 605 may be formed on the substrate 115 by deposition and patterning or other techniques. Each may form a temporary skeleton on which material may be deposited to form the fluidic access port 103 or 105. They may be of any size (e.g., 1-5 µm height, 10-100 µm width, and 25-150 µm length).

As illustrated in FIG. 6(C), material may then be formed over the sacrificial photoresist layers 603 and 605 by deposition and patterning or other techniques to form the fluidic access ports 103 and 105, respectively. The material may be of any type, such as Parylene C. It may have any thickness (e.g., 1-10 µm).

As illustrated in FIG. 6(D), a sacrificial photoresist layer 607 may be formed on the substrate 115 by deposition and patterning or other techniques so as to form the skeleton for the chamber 101. It may have any size or shape (e.g., cylindrical with a 10-200 µm diameter and 1-20 µm height).

As illustrated in FIG. 6(E), material may then be formed over the sacrificial photoresist layer 607 by deposition and patterning or other techniques to form the chamber 101. Again, any material may be used, such as Parylene C. It may have any thickness (e.g., 1-10 µm).

The sacrificial photoresist layers 603 and 605 within the fluidic access ports 103 and 105 and the sacrificial photoresist layer 607 within the chamber 101 may then be removed, such as by immersing the completed structure in solvents, such as acetone and isopropyl alcohol.

As illustrated in FIG. 6(F), the chamber 101 may then be filled with a fluid, such as by passively soaking the device in deionized (DI) water or 1× phosphate buffered saline (PBS).

Figure 7:
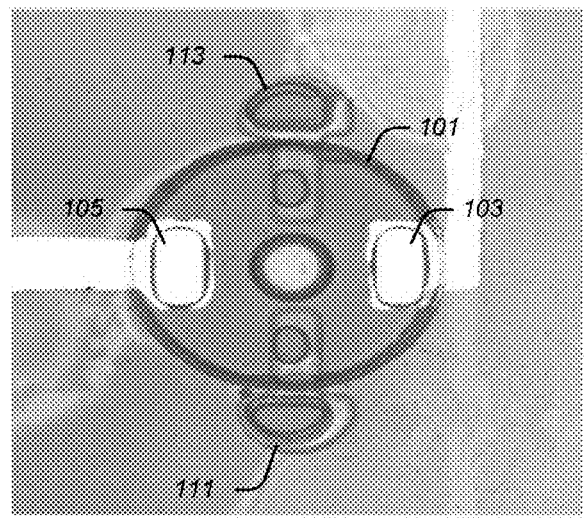
FIG. 7 illustrates an optical micrograph of the MEMS pressure transducer illustrated in FIG. 1.

FIG. 7 illustrates an optical micrograph of the MEMS pressure transducer illustrated in FIG. 1.

Figure 8:
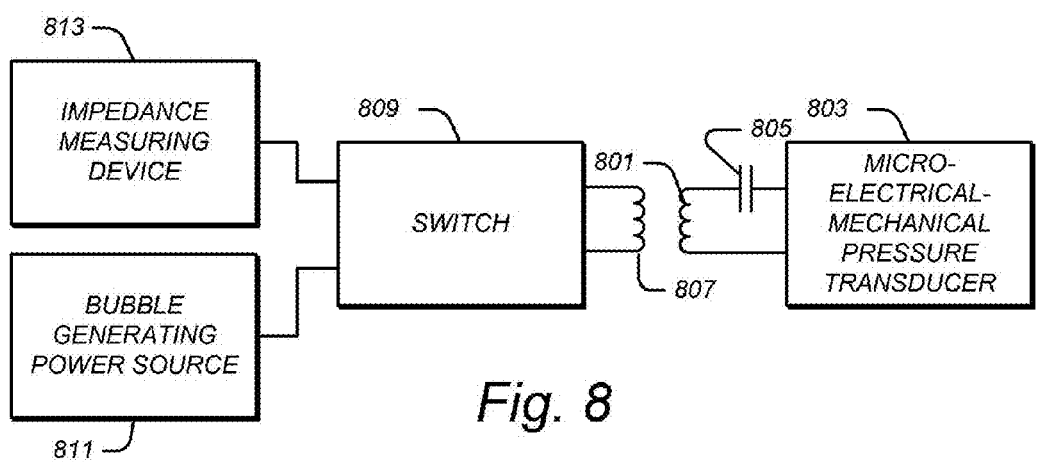
FIG. 8 illustrates an example of a system that may wirelessly deliver power to and wirelessly receive pressure readings from the MEMS pressure transducer illustrated in FIG. 1.

FIG. 8 illustrates an example of a system that may wirelessly deliver power to and wirelessly receive pressure readings from the MEMS pressure transducer illustrated in FIG. 1. As illustrated in FIG. 8, a coil 801 may receive power to and deliver an impedance-measuring signal from a MEMS pressure transducer 803 through a capacitance 805. The power may be delivered to and the signal received from the electrodes 111 and 113 within the MEMS pressure transducer 803. A corresponding coil 807 may be positioned near the coil 801 external to the MEMS pressure transducer 803 and used to deliver the power which is necessary to generate the gaseous bubble 109 from a bubble generating power source 811 through a switch 809. Thereafter, the coil 807 may be used to measure the impedance of the fluid 107 within the MEMS pressure transducer 803 by an impedance measuring device 813. The switch 809 may be configured to switch the coil 807 between the bubble generating power source 811 and the impedance measuring device 813 as needed, either automatically on a periodic basis related to the absorption rate of the gaseous bubble 109 by the fluid 107 or upon command by a user.

Figure 9:
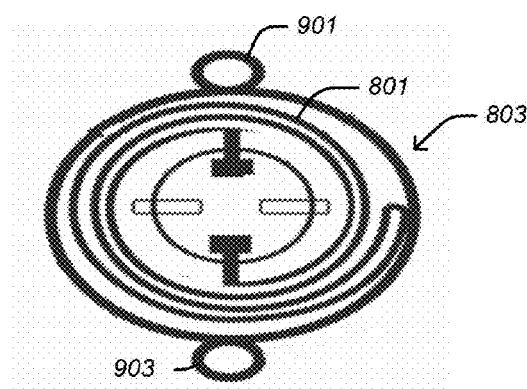
FIG. 9 illustrates an example of the MEMS pressure transducer illustrated in FIG. 1 fitted with components that may facilitate the wireless receipt of power and the wireless delivery of pressure readings.

FIG. 9 illustrates an example of the MEMS pressure transducer illustrated in FIG. 1 fitted with components that may facilitate the wireless receipt of power and the wireless delivery of pressure readings. This includes the coil 801 which may be embedded in the substrate 115 of the MEMS pressure transducer. FIG. 9 also illustrates one or more suture tabs, such as suture tabs 901 and 903, which may be used to affix the MEMS pressure transducer 803 to patient tissue.

Figure 10:
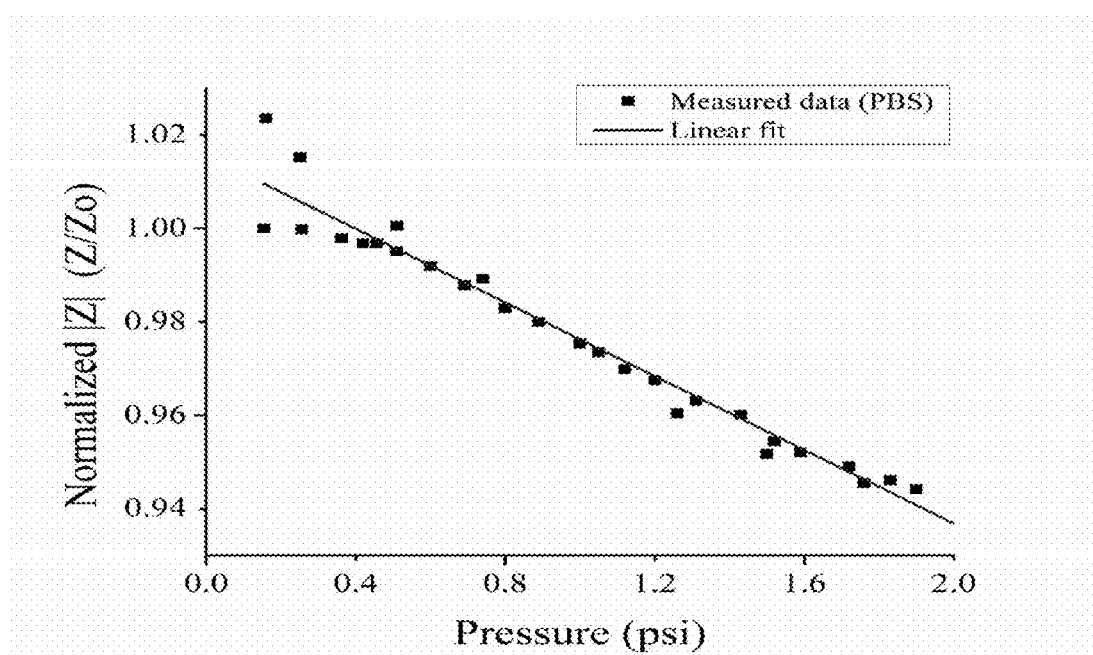
FIG. 10 illustrates a graph of an example of measured impedance within the chamber of the MEMS pressure transducer illustrated in FIG. 1 as a function of pressure.

FIG. 10 illustrates a graph of an example of measured impedance within the chamber of the MEMS pressure transducer illustrated in FIG. 1 as a function of pressure.

Figure 11:
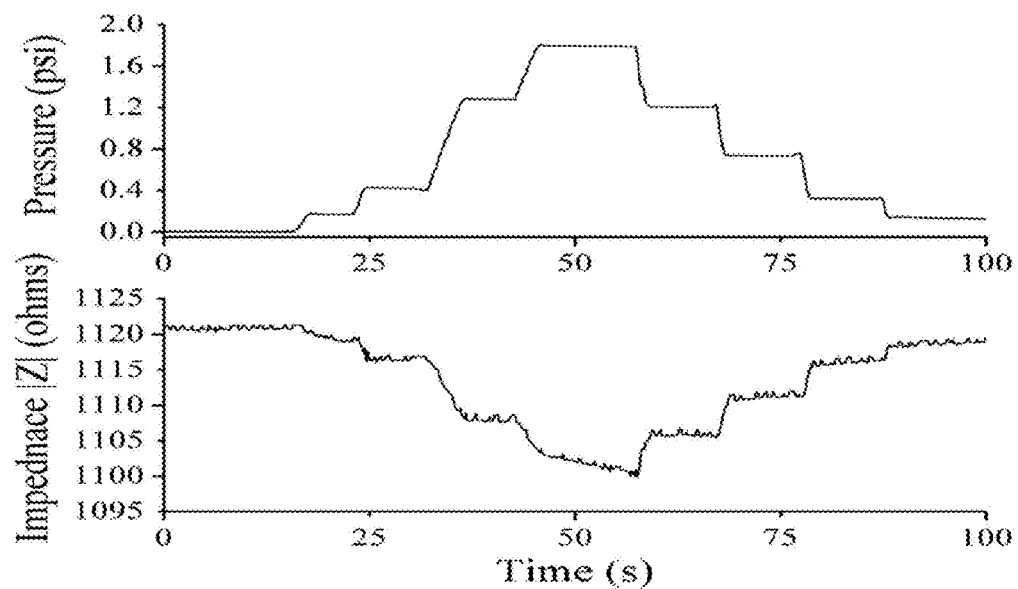
FIG. 11 illustrates graphs of example changes in pressure and resulting changes in measured impedance within the chamber of the MEMS pressure transducer illustrated in FIG. 1 as a function of time.

FIG. 11 illustrates graphs of example changes in pressure and resulting changes in measured impedance within the chamber of the MEMS pressure transducer illustrated in FIG. 1 as a function of time.

Figure 12:
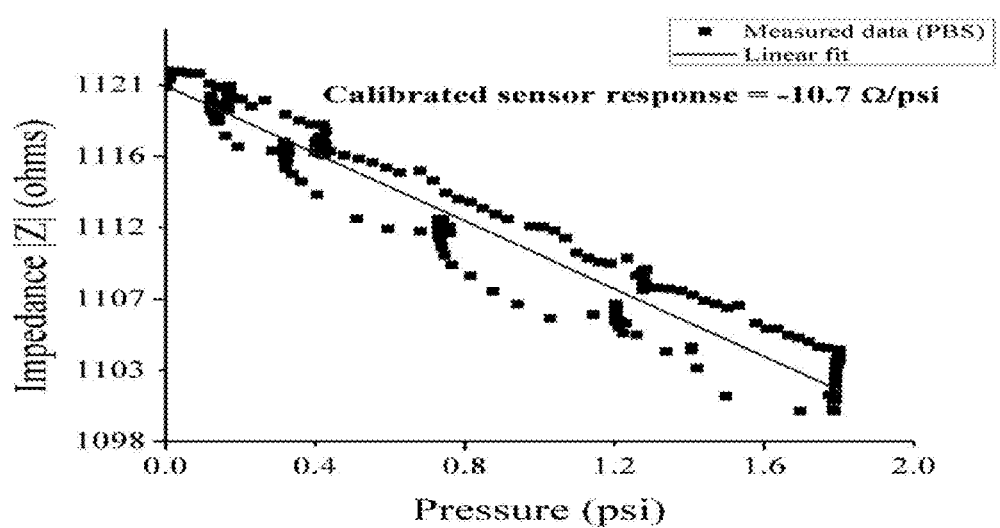
FIG. 12 illustrates an example of a linear fit of the data illustrated in FIG. 11.

FIG. 12 illustrates an example of a linear fit of the data illustrated in FIG. 11. The linear fit to the response curve yields in this example a sensor pressure sensitivity of −10.7μ/PSI.

The components, steps, features, objects, benefits and advantages which have been discussed are merely illustrative. None of them, nor the discussions relating to them, are intended to limit the scope of protection in any way. Numerous other embodiments are also contemplated. These include embodiments which have fewer, additional, and/or different components, steps, features, objects, benefits and advantages. These also include embodiments in which the components and/or steps are arranged and/or ordered differently.

For example, a fluid coupling port having a bottom-side opening (10-150 μm diameter) may be positioned centrally within the chamber. Also, for example, the shape of the chamber need not be circular (can be, for example, rectangular, square, elliptical). Gas other than hydrogen and oxygen may also be used for pressure sensing, such as nitrogen and argon.

Unless otherwise stated, all measurements, values, ratings, positions, magnitudes, sizes, and other specifications which are set forth in this specification, including in the claims which follow, are approximate, not exact. They are intended to have a reasonable range which is consistent with the functions to which they relate and with what is customary in the art to which they pertain.

All articles, patents, patent applications, and other publications which have been cited in this disclosure are incorporated herein by reference.

The phrase "means for" when used in a claim is intended to and should be interpreted to embrace the corresponding structures and materials which have been described and their equivalents. Similarly, the phrase "step for" when used in a claim is intended to and should be interpreted to embrace the corresponding acts which have been described and their equivalents. The absence of these phrases in a claim mean that the claim is not intended to and should not be interpreted to be limited to any of the corresponding structures, materials, or acts or to their equivalents.

The scope of protection is limited solely by the claims which now follow. That scope is intended and should be interpreted to be as broad as is consistent with the ordinary meaning of the language which is used in the claims when interpreted in light of this specification and the prosecution history which follows and to encompass all structural and functional equivalents. Notwithstanding, none of the claims are intended to embrace subject matter which fails to satisfy the requirement of Sections 101, 102, or 103 of the Patent Act, nor should they be interpreted in such a way. Any unintended embracement of such subject matter is hereby disclaimed.

Except as stated immediately above, nothing which has been stated or illustrated is intended or should be interpreted to cause a dedication of any component, step, feature, object, benefit, advantage, or equivalent to the public, regardless of whether it is or is not recited in the claims.

The invention claimed is:

1. A pressure transducer for measuring pressure comprising:
   a chamber that has no dimension greater than 1 mm; and
   pressure-sensing components configured to measure pressure within the chamber.

2. The pressure transducer of claim 1 wherein the pressure-sensing components are configured to measure hydrostatic pressure within the chamber.

3. The pressure transducer of claim 2 wherein the pressure-sensing components include:
   fluid within the chamber;
   a gaseous bubble within the fluid; and
   volume-sensing components configured to measure changes in the volume of the gaseous bubble caused by changes in the hydrostatic pressure of the fluid.

4. The pressure transducer of claim 3 wherein the volume-sensing components include electrochemical impedance sensing components configured to measure changes in the impedance of the fluid caused by changes in the volume of the gaseous bubble.

5. The pressure transducer of claim 4 wherein the electrochemical impedance sensing components include electrodes in contact with the fluid.

6. The pressure transducer of claim 3 further comprising electrodes configured to generate the gaseous bubble with electrolysis.

7. The pressure transducer of claim 2 wherein the pressure transducer is for measuring the hydrostatic pressure of fluid outside of the chamber and further comprises at least one port through the chamber configured to transfer the hydrostatic pressure from the fluid outside of the chamber to within the chamber.

8. The pressure transducer of claim 1 wherein the chamber is made of polymeric material.

9. A pressure transducer for measuring pressure comprising:
- a chamber;
- fluid within the chamber;
- a gaseous bubble within the fluid; and
- volume-sensing components configured to measure changes in the volume of the gaseous bubble caused by changes in fluidic pressure within the chamber.

10. The pressure transducer of claim 9 wherein the volume-sensing components include electrochemical impedance sensing components configured to measure changes in the impedance of the fluid caused by changes in the volume of the gaseous bubble.

11. The pressure transducer of claim 10 wherein the electrochemical impedance sensing components include electrodes in contact with the fluid.

12. The pressure transducer of claim 9 wherein the pressure transducer is for measuring the hydrostatic pressure of fluid outside of the chamber and further comprises at least one port through the chamber configured to transfer the hydrostatic pressure from the fluid outside of the chamber to the fluid within the chamber.

13. The pressure transducer of claim 9 further comprising electrodes configured to generate the gaseous bubble with electrolysis.

14. The pressure transducer of claim 9 wherein the chamber is made of polymeric material.

15. A process for manufacturing a pressure transducer for measuring pressure comprising:
- making a chamber;
- placing fluid within the chamber; and
- generating a gaseous bubble within the fluid,
- whereby the process results in the construction of the pressure transducer.

16. The process of claim 15 wherein the gaseous bubble is generated with electrolysis.

17. The process of claim 15 wherein the chamber is made by a deposition process.

18. The process of claim 17 wherein the chamber is made by the removal of deposited material.

19. The process of claim 15 wherein the chamber is made of a polymeric material.

20. A process for manufacturing a pressure transducer chamber for measuring pressure within the chamber comprising:
- depositing a series of layers on a substrate; and
- removing at least one deposited layer,
- wherein the process results in the construction of the pressure transducer chamber.

21. The process of claim 20 wherein one of the deposited layers is made of a polymeric material.

22. The process of claim 20 wherein the at least one deposited layer which is removed is made of a photoresist material.

* * * * *